United States Patent [19]

Dummermuth

[11] Patent Number: 4,523,361

[45] Date of Patent: Jun. 18, 1985

[54] PORTABLE SURFACE PROCESSING APPARATUS

[75] Inventor: Paul Dummermuth, Zunzgen, Switzerland

[73] Assignee: Von Arx A.G. Maschinenfabrik, Sissach, Switzerland

[21] Appl. No.: 511,389

[22] Filed: Jul. 6, 1983

[30] Foreign Application Priority Data

Jul. 6, 1982 [CH] Switzerland ........................ 4108/82

[51] Int. Cl.$^3$ ........................ B23D 79/02; B24B 7/18

[52] U.S. Cl. ........................ 29/81 J; 51/176; 125/5

[58] Field of Search ........... 51/176, 174, 180, 170 PT; 125/5; 29/81 R, 81 J, 81 L

[56] References Cited

U.S. PATENT DOCUMENTS

| | | | |
|---|---|---|---|
| 1,648,888 | 11/1927 | Aurand | 29/81 J |
| 1,758,647 | 5/1930 | Burrell et al. | 125/5 |
| 2,525,250 | 10/1950 | Westphal | 29/81 L |
| 2,621,350 | 12/1952 | Bye | 51/174 |
| 2,664,281 | 12/1953 | Luksch et al. | 125/5 |
| 3,101,524 | 8/1963 | Falls | 29/81 J |
| 3,695,723 | 10/1972 | Kita et al. | 51/176 |

FOREIGN PATENT DOCUMENTS

| | | | |
|---|---|---|---|
| 68792 | 5/1914 | Switzerland | 51/176 |
| 376261 | 6/1932 | United Kingdom | 29/81 J |
| 753654 | 8/1980 | U.S.S.R. | 51/176 |

*Primary Examiner*—Roscoe V. Parker
*Attorney, Agent, or Firm*—Lee, Smith & Zickert

[57] ABSTRACT

A portable surface processing apparatus which has two rotors ($R_1$, $R_2$) fitted with blades driven in opposite directions by a motor (M). The reaction forces arising in the processing therefore mutually cancel each other.

4 Claims, 4 Drawing Figures

PORTABLE SURFACE PROCESSING APPARATUS

BACKGROUND OF THE INVENTION

The invention relates to a portable surface processing apparatus with two oppositely motor-driven rotor cages with horizontal axes, a plurality of processing elements arranged on cage bars of the cages, and adjustable wheels arranged to raise and lower the rotor cages.

Such apparatuses are known, for example, from U.S. Pat. No. Des. 252,880 and are constructed both as hand tools, as well as larger apparatus movable on rollers. In such apparatus the rotor can be driven both by an electric motor, and by a combustion motor. An alternative drive can also be a pneumatic motor.

The apparatus serves for surface processing, such as rust removal from relatively large surfaces, removing old paint, cleaning dirty concrete floors, etc. The processing remains restricted to the surface; the processing depth is, to be sure, adjustable, but only slightly. The processing is accomplished by the processing elements arrayed on the rotor cage bars, such as, for example, blades.

The above-mentioned known apparatuses have only one rotor cage. This has the disadvantage that the processing force acts in one direction upon the surface being treated, so that the apparatus has the tendency to move automatically in one direction. In the opposite direction, however, it can be shifted only with difficulty. This undesired reaction force is especially pronounced in the case of relatively heavy and larger apparatus.

From German Pat. No. 509,435 and U.S. Pat. No. 2,588,707 there are known, further, surface processing machines with two oppositely motor-driven rotors which are suited for shaving, grinding or polishing of wood floors. The rotors of these patents rest directly on the surface to be processed.

SUMMARY OF THE INVENTION

The invention provides a surface-processing apparatus of the type mentioned, in which the reaction force previously felt as a disadvantage can be utilized desirably. The invention provides two rotor cages borne turnably on a chassis that is provided with wheels which are arranged in each case on the lower end of a two-armed pivot lever. On the upper ends of these pivot levers is located a connecting rod. The upper arms of the two-armed pivot lever together with the connecting rod and the connecting line of the pivot axes form an angle-adjustable parallelogram, in which the angle adjustment brings about a change of the relative position of the chassis with respect to the surface to be processed.

DESCRIPTION OF THE DRAWINGS

The drawings show an example of a preferred embodiment of the invention, in which.

DESCRIPTION OF THE PREFERRED EMBODIMENT

Figure 1:
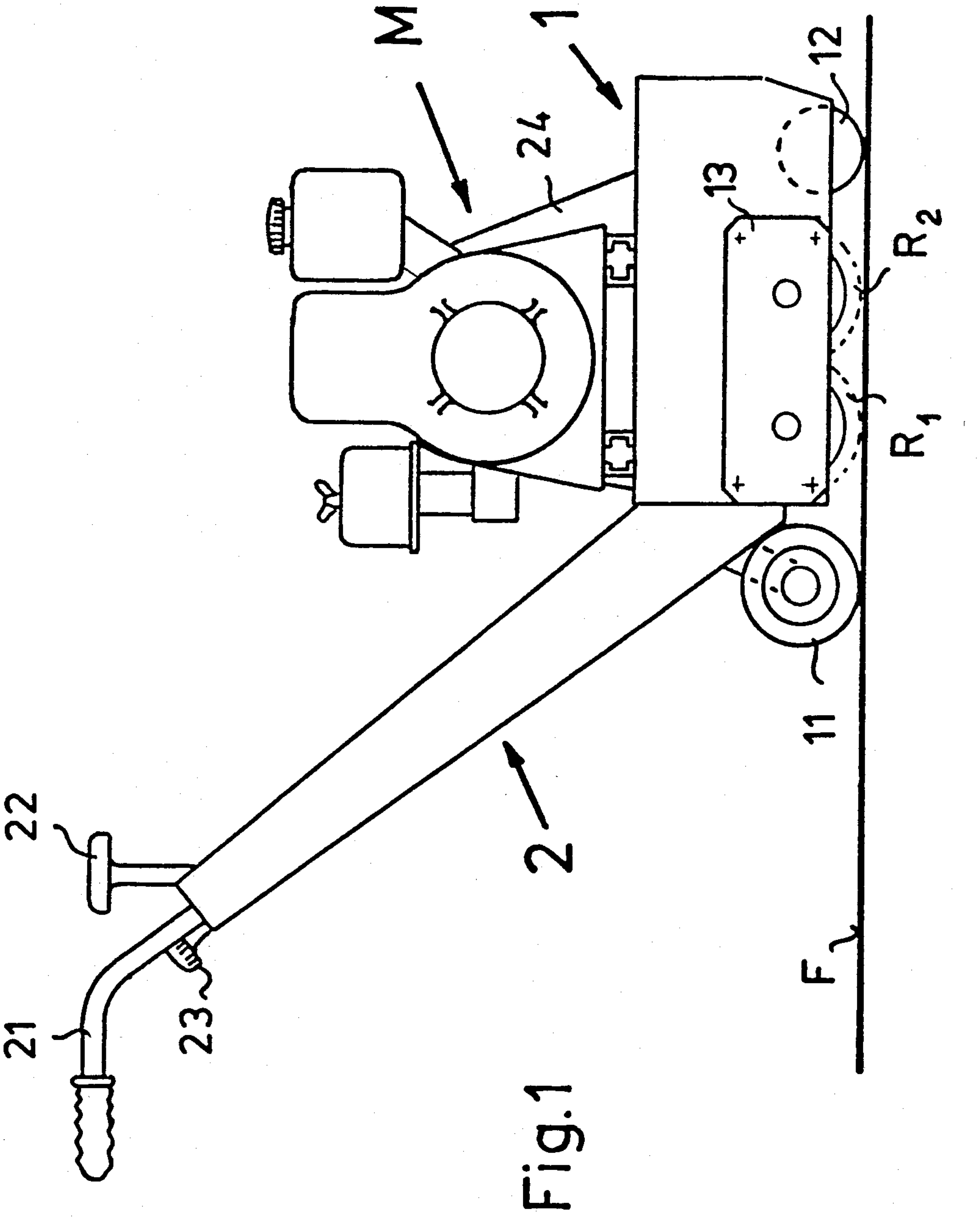
FIG. 1 illustrates a side view of a portable surface processing apparatus.

The apparatus represented in FIG. 1 resembles on superficial examination a lawnmower with motor drive. The apparatus is equipped with an internal combustion motor M. This is secured to the chassis, which is designated generally with 1.

The chassis 1 is provided with two rear wheels 11 and one front wheel 12. To the back of the chassis 1 there is rigidly fastened a steering thrust device 2, which extends upward at an angle of about 45°. To the upper end of the device 2 are fastened two spaced steering handles 21, with which the apparatus is steered. The height of the chassis 1 over the surface F to be processed is adjusted by means of a lever 22. With the aid of the knob 23 the elevational setting of the front wheel 12 with respect to the two rear wheels 11 can be adjusted, as described in detail below.

In the interior of the chassis 1, two rotors $R_1$, $R_2$ are mounted to be driven in opposite directions by the motor M. On the side visible in FIG. 1 the bearings for the rotors $R_1$, $R_2$ are arranged on a removable plate 13. When the plate 13, which is fastened to the chassis 1 by means of screws, is removed together with the bearings fastened to it, it is possible to take out the two rotor cages together with the blades fastened to them and change or check them. In operation the processing blades are subject to a certain amount of wearing down and after a certain time of operation they must be replaced or re-equipped.

Figure 2:
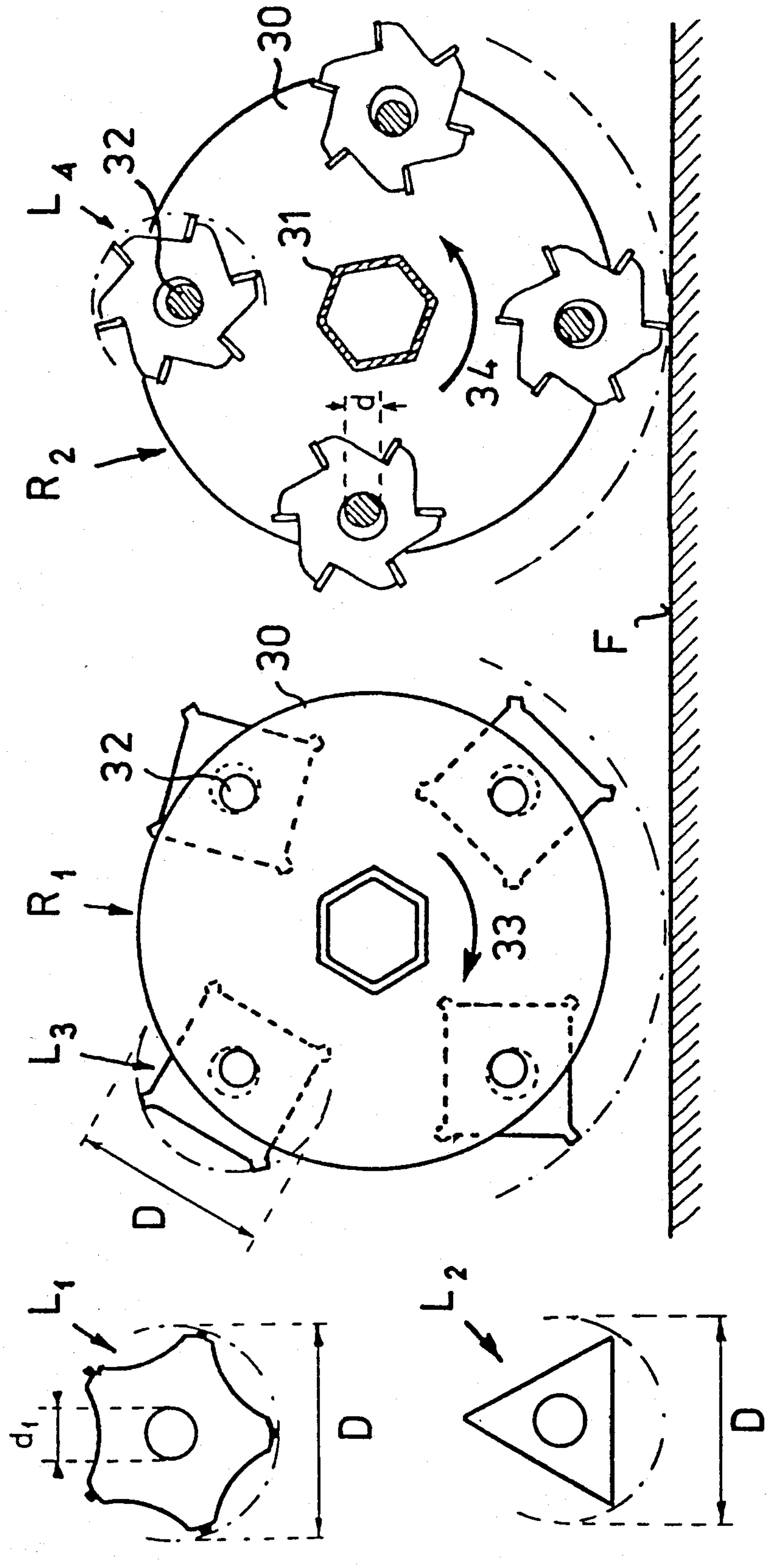
FIG. 2 illustrates the two rotors of the apparatus in greater detail and on a larger scale as well as two other blades by themselves.

In FIG. 2 the two rotors $R_1$, $R_2$ are shown by themselves. Rotor $R_1$ is in elevation and rotor $R_2$ is represented in section. Each rotor has a cage which comprises two spaced side plates 30, a hollow hexagonal shaft 31 and four cage bars 32 extending between the side plates 30. One of the two side plates 30 is detachable from the cage bars so that processing bodies $L_1$, $L_2$, $L_3$, or $L_4$ can be mounted on the cage bars 32, or removed and changed. The hollow hexagonal shafts 31 extend from the drive shafts firmly borne on one side of the chassis 1. The processing elements L can present various forms according to the surface to be processes. All elements intended for the apparatus have the same outside processing diameter D and a bore with the same diameter $d_1$, which is greater than the diameter d of the cage bars 32 on which they are arrayed.

The elements $L_1$ have the form of pentagonal blades which have hard metal tips. The processing elements $L_2$, in contrast, are triangular blades which merely have hardened points. Rotor $R_1$ is equipped, for example, with quadrangular blades $L_3$ with hard metal inserts and rotor $R_2$ has processing elements $L_4$ in the form of milling tools with hard metal tips.

FIG. 2 shows the rotors during operation, in which case the processing elements, insofar as their bore admits, are pushed radially outward by centrifugal force. The arrows 33 and 34 indicate the rotational direction. The rotation is chosen in such a way that it is directed away from one another on the side of the surface to be processed. Thus, the material removed from the surface, i.e., dust or shavings, is flung outward. If the turning direction of the rotors are directed one against the other on the side of the surface to be processed, the removed material would accumulate between the rotors.

Figures 3, 3A:
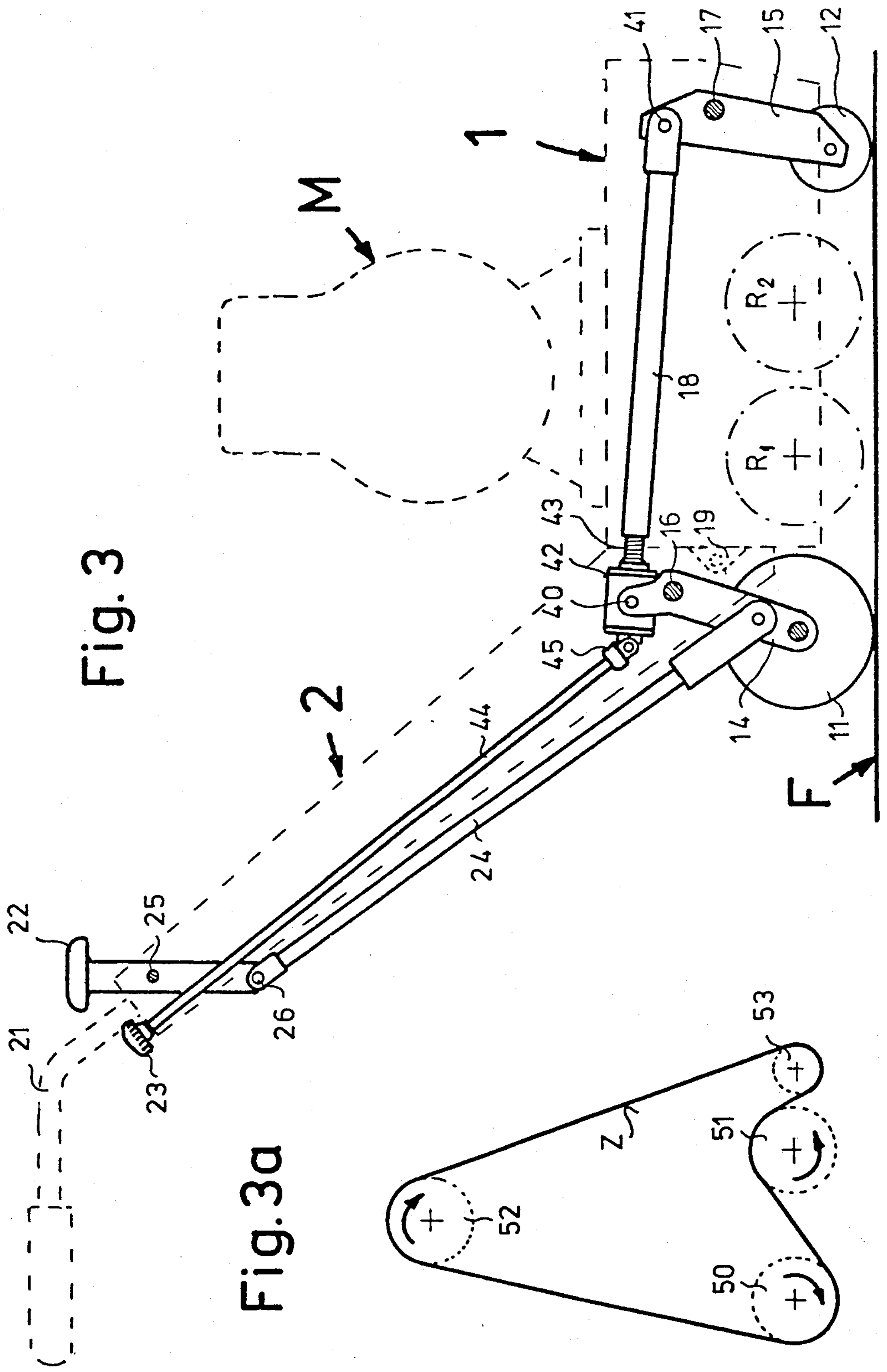
FIG. 3 illustrates the mechanism for the elevational adjustment.
FIG. 3*a* illustrates the drive of the rotors.

The parts serving for the elevational adjustment are represented in FIG. 3. The same parts as in FIG. 1 are provided with the same reference symbols. The wheels 11 and 12 are each fastened to the end of a two-armed lever 14, 15, which are swingable about fixed axes 16 and 17, respectively. The other ends of the levers 14, 15 are joined with one another through a connecting rod 18, so that they form a parallelogram.

A rod 24 is attached to the lever 14 and leads to the adjusting lever 22. The lever 22 pivots about an axis 25 arranged in part 2. A shifting of the lever 22 leads, therefore, to an angle adjustment of the parallelogram 14, 15, 18 and thereby to an elevational adjustment of the chassis 1 with respect to the surface F, which leads to a change of the processing intensity of the blade-fitted rotors $R_1$, $R_2$. So that it will be possible for this elevational adjustment to be carried out by means of the relatively short lever 22, there is arranged a weight-compensation spring (omitted in the drawing in the interest of clarity) which is constructed as a tension spring and which extends from an eye 19 on the chassis to the rod 24.

The above-described parts permit a like and simultaneous elevation adjustment of both the wheels 11, 12. A separate, slight alteration of the elevation adjustment of the front wheel 12 can be achieved by a length change of the connecting rod 18. It is connected by means of connections 40, 41 with the upper ends of the levers 14, 15. Connection 40 is constructed as a sleeve 42 with lateral pivots. In the sleeve 42 there is borne turnably but axially fixed a threaded pin 43, the threaded part of which is screwed into a female thread in the connecting rod 18. A rotation of the threaded pin in one or the other direction, therefore, results in an increase or a reduction of the distance between the connections 40, 41. The turning of the threaded pin is accomplished by rotation of the knob 23, the movement of which is transferred over the rod 44 and a Cardan joint 45 to the threaded pin 43.

FIG. 3*a* schematically shows how the drive in opposite directions from the drive motor M is accomplished. On the drive shafts of the rotors $R_1$, $R_2$ and on the shaft of the motor there are arranged gear belt pulleys 50, 51, 52 and beside the belt pulley 51 there is a freely turnable deflecting roll 53. The rotors are driven by means of a belt Z toothed on both sides. The belt is covered by means of a hood 24 (FIG. 1).

OPERATION

With Motor M running and setting of the lever 22 about in the position as shown in FIGS. 1 and 3, the rotors $R_1$, $R_2$ turn in opposite directions, without the blades L touching the surface F. If now lever 22 is slid forward about the axis 25, the chassis 1 descends and the blades contact the processing surface F. When the lever 22 is swung further forward, the chassis descends further and the processing becomes more intensive. The processing strength can in this manner be adjusted very finely and sensitively from zero up to the maximum.

The apparatus of the invention behaves neutrally and can be driven forward or backward over the surface to be treated with the aid of the two steering handles 21.

Instead of an internal combustion motor M it is also possible to use an electric motor or a compressed-air motor. In the case of use of a pneumatic motor the waste air of the same can be used to blow away the abrasions or the shavings. Instead of a belt geared on two sides of the drive of the rotors it would also be possible to use a chain.

What is claimed is:

1. Portable surface processing apparatus with two rotor cages driven by a motor in opposite directions with horizontal axes, cage bars in the rotor cages, and a plurality of processing elements mounted on the cage bars, and having elevationally adjustable wheels in front and behind the rotor cages, characterized in that the two rotor cages ($R_1$, $R_2$) are turnably borne in a chassis (1) which is provided with wheels (11, 12) which are each arranged on the lower end of a two-armed swinging lever (14, 15), the upper ends of the swinging levers (14, 15) are connected by a connecting rod (18), and the two-armed swinging levers (14, 15) together with the connecting rod (18) and the connecting line of the swinging axes (16, 17) form an angle-adjustable parallelogram, in which the angle adjustment brings about a change of the relative height of the chassis (1) with respect to the surface (F) to be treated, said connecting rod (18) including a front connection (41) and a rear connection (40) which includes a sleeve (42), in which a screw pin (43) is borne axially fixed but turnable, the screw pin (43) having a threaded part which is screwed into a female portion of the connecting rod (18), so that through rotation of the screw pin (43) the spacing between the connections (40, 41) is increased or decreased and the height of the chassis from the surface to be treated can be adjusted forward in the apparatus independently of the height of the back

2. Apparatus according to claim 1, characterized in that on the rear swinging lever (14) there is attached an operating rod (24) which leads to an adjusting lever (22, 25, 26) with the aid of which the two swinging levers and thereby the height of the chassis (1) over the surface (F) to be treated is adjustable.

3. Apparatus according to claim 1, characterized in that rotation of the screw pin (43) is conducted by means of a Cardan joint (45) and a shaft (44) which is provided with an operating knob (23).

4. Apparatus according to claim 1, characterized in that the turning direction of the rotor cages ($R_1$, $R_2$) on the side of the surface (F) to be treated is directed away from one another.

* * * * *